US008010568B2

(12) United States Patent  (10) Patent No.: US 8,010,568 B2
Megerian  (45) Date of Patent: *Aug. 30, 2011

(54) ENFORCING CONSTRAINTS FROM A PARENT TABLE TO A CHILD TABLE

(75) Inventor: Mark Gregory Megerian, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 455 days.

This patent is subject to a terminal disclaimer.

(21) Appl. No.: 12/220,164

(22) Filed: Jul. 21, 2008

(65) Prior Publication Data
US 2008/0288555 A1    Nov. 20, 2008

Related U.S. Application Data

(63) Continuation of application No. 11/272,580, filed on Nov. 10, 2005, now Pat. No. 7,440,956.

(51) Int. Cl.
    G06F 7/00      (2006.01)
    G06F 17/30     (2006.01)
(52) U.S. Cl. .................................. 707/791; 707/796
(58) Field of Classification Search ........... 707/600–831
    See application file for complete search history.

(56) References Cited

U.S. PATENT DOCUMENTS

| 5,133,068 A | | 7/1992 | Crus |
| 5,499,359 A | * | 3/1996 | Vijaykumar ................ 707/696 |
| 6,339,777 B1 | * | 1/2002 | Attaluri et al. ...................... 1/1 |

OTHER PUBLICATIONS

Tansel, Integrity constraints in temporal relational databases, Apr. 5-7, 2004, IEEE, vol. 2, 5 pages.*
Elmasri et al., "Fundamentals of Database Systems," 1994, Addison-Wesley, Second Edition (146-150, 189, and 213), All pages.
Transact-SQL User's Guide, "Check," Accessed Jun. 3, 2008, pp. 1-2.
Yang et al., "Mapping Referential Integrity Constraints from Relational Databases to XML," 2001, Springer-Verlag, pp. 329-340.

* cited by examiner

*Primary Examiner* — Jean B Fleurantin
(74) *Attorney, Agent, or Firm* — Owen J. Gamon

(57) ABSTRACT

An apparatus, system, and storage medium that, in an embodiment, receive a constraint command that specifies a parent table, a primary key in the parent table, a child table, and a foreign key in the child table, and enforce that all values for the primary key in the parent table are present in the foreign key in the child table. In an embodiment, the enforcing may include receiving an insert command that specifies a target key, a target value for the target key, and a target table; determining whether the target table matches the parent table and whether, within a transaction that includes the insert command, the child table includes at least one row with a foreign key value that equals the target value of the primary key; inserting the target value in the target table if the determining is true; and returning an error otherwise.

14 Claims, 7 Drawing Sheets

CONSTRAINT DATA 168

| CONST ID | PARENT TABLE | PRIM KEY | CHILD TABLE | FOREIGN KEY | CONST TYPE | DELETE ACTION | |
|---|---|---|---|---|---|---|---|
| WG_REQ1 | WORK GROUP | WORK GROUP NUM | WORK GROUP MBRS | WORK GROUP NUM | FOREIGN KEY | CASCADE | 305 |
| WG_REQ2 | WORK GROUP | WORK GROUP NUM | WORK GROUP MTGS | WORK GROUP NUM | FOREIGN KEY | CASCADE | 310 |
| WG_REQ3 | WORK GROUP | WORK GROUP NUM | WORK GROUP PPRS | WORK GROUP NUM | FOREIGN KEY | CASCADE | 315 |
| WG_REQ4 | WORK GROUP | WORK GROUP NUM | WORK GROUP MBRS | WORK GROUP NUM | REQUIRES | CASCADE | 320 |

Columns: 330, 335, 340, 345, 350, 355, 360

FIG. 3

ENFORCING CONSTRAINTS FROM A PARENT TABLE TO A CHILD TABLE

CROSS REFERENCE TO RELATED APPLICATION

This is a continuation application of U.S. patent application Ser. No. 11/272,580, filed Nov. 10, 2005 now U.S. Pat. No. 7,440,956, to Mark G. Megerian, entitled "ENFORCING CONSTRAINTS FROM A PARENT TABLE TO A CHILD TABLE," which is herein incorporated by reference.

FIELD

This invention generally relates to computer database management systems and more specifically relates to enforcing constraints from a parent table to a child table in a database.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

Fundamentally, computer systems are used for the storage, manipulation, and analysis of data, which may be anything from complicated financial information to simple baking recipes. It is no surprise, then, that the overall value or worth of a computer system depends largely upon how well the computer system stores, manipulates, and analyzes data. One mechanism for managing data is called a database management system (DBMS), which may also be called a database system.

Many different types of databases are known, but the most common is usually called a relational database (RDB), which organizes data in tables that have rows, which represent individual entries or records in the database, and columns, which define what is stored in each entry or record. Columns may also be called fields. Each table has a unique name within the database and each column has a unique name within the particular table. The database also has an index, which is a data structure that informs the database management system of the location of a certain row in a table given an indexed column value, analogous to a book index informing the reader on which page a given word appears.

Databases typically provide keys, and a key is one or more columns in a table that the database uses to sort data. Most database management systems allow more than one key, allowing records to be sorted in different ways. One of the keys is designated the primary key, and must hold a unique value for each row. A key that identifies rows in a different table is called a foreign key. A foreign key (FK) is a field (column) in a database record that points to a field (column) of another database record in another table. Usually a foreign key in one table refers to the primary key of the other table.

Referential integrity is a feature provided by relational database management systems that prevents users or applications from entering inconsistent data between tables. For example, suppose Table B has a foreign key that points to a column in Table A. Referential integrity prevents adding a record to Table B (the child table) that cannot be linked to Table A (the parent table). Thus, the value of the foreign key in the record in table B (the child table) must already exist in the corresponding column in table A (the parent table). Hence, the primary key is often called the parent key and the foreign key the child key in the relationship because a child cannot exist without its parent. In addition, the referential integrity rules might also specify that whenever a record is deleted from Table A (the parent table), any records in Table B (the child table) that are linked to the deleted record are also deleted, which is called a cascading delete. Finally, the referential integrity rules may specify that whenever the value in a linked column is modified in Table A, all records in Table B that are linked to it will also be modified accordingly, which is called a cascading update. Thus, cascading deletes and updates enforce the relationship that a child cannot exist without its parent.

Although referential integrity is a useful technique, it is limited in that it enforces integrity rules in only one direction, i.e., the primary key is the parent and the foreign key is the child in the relationship. Attempting to create bi-directional referential integrity by defining a key in table A as both a primary and a foreign key (and likewise for a key in table B) causes a cyclical constraint, which leads to deadlocks and infinite loops.

Thus, what is needed is a technique for creating bi-directional referential integrity.

SUMMARY

An apparatus, system, and storage medium are provided that, in an embodiment, receive a constraint command that specifies a parent table, a primary key in the parent table, a child table, and a foreign key in the child table, and enforce that all values for the primary key in the parent table are present in the foreign key in the child table. In an embodiment, the enforcing may include receiving an insert command, wherein the insert command specifies a target key, a target value for the target key, and a target table; determining whether the target table matches the parent table and whether, within a transaction that includes the insert command, the child table includes at least one row with a foreign key value that equals the target value of the primary key; inserting the target value in the target table if the determining is true; and returning an error if the determining is false. In an embodiment, the enforcing may include receiving a delete command directed to a target value of a target key in a target table; deciding whether the target table matches the child table, whether the target key matches the foreign key, and whether the delete command requests deletion of all rows from the child table with the target value; returning an error if the deciding is true; and deleting the rows from the target table with the target value for the target key if the deciding is false.

BRIEF DESCRIPTION OF THE DRAWINGS

Various embodiments of the present invention are hereinafter described in conjunction with the appended drawings:

FIG. 3 depicts a block diagram of constraint data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

An embodiment of the invention provides bi-directional referential integrity constraints. In contrast to prior referential integrity constraints, which provide that for every row in a child table, the value in the foreign key must have a matching primary key value in the parent table, an embodiment of the invention enforces a constraint where, for every primary key value in the parent table, the child table has at least one matching foreign key value.

Figure 1:
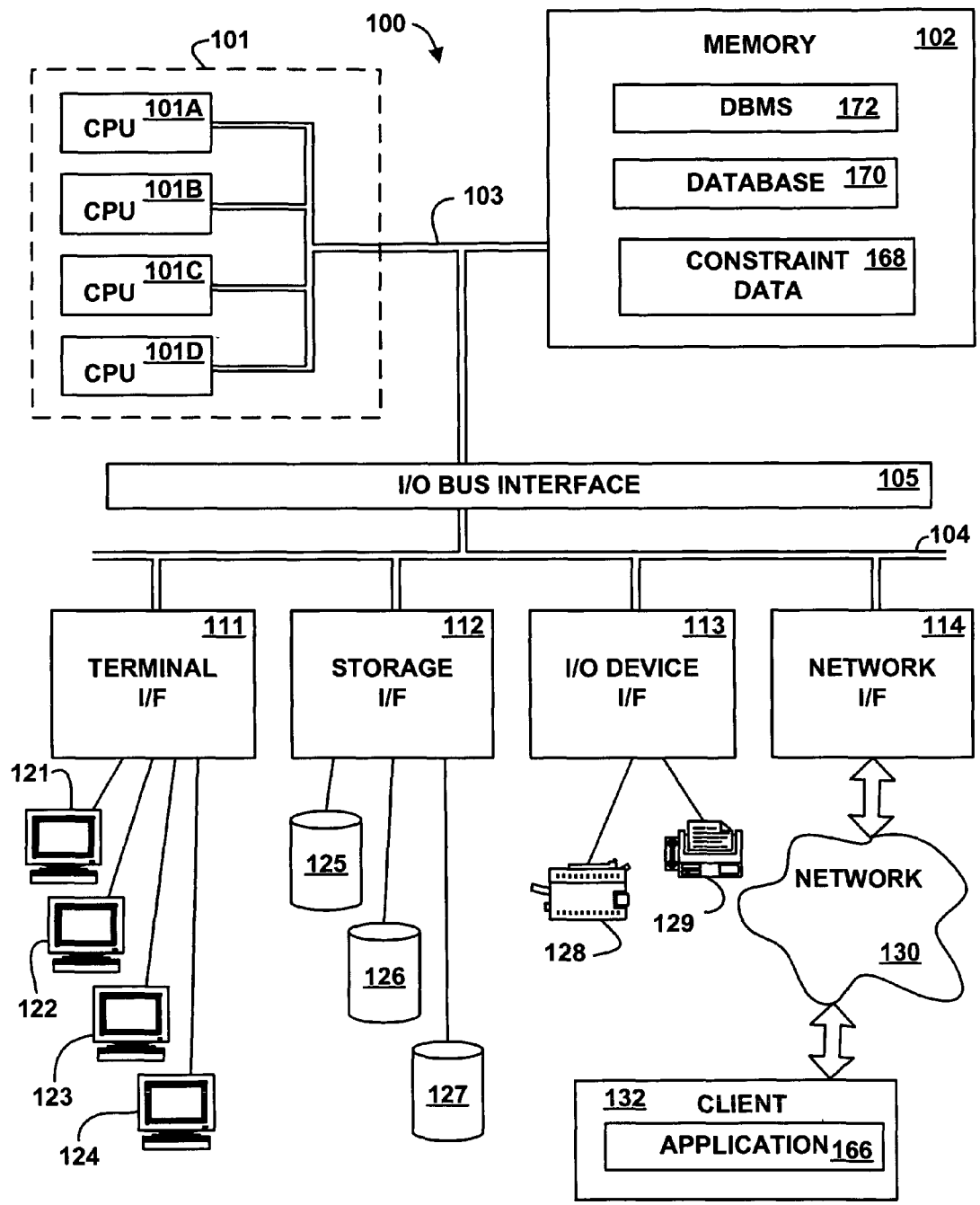
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to a client 132, according to an embodiment of the present invention. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system. The computer system 100 acts as a server for the client 132, but the terms "server" and "client" are used for convenience only, and in other embodiments an electronic device that is used as a server in one scenario may be used as a client in another scenario, and vice versa.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes constraint data 168, a database 170, and a database management system 172. Although the constraint data 168, the database 170, and the database management system 172 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the constraint data 168, the database 170, and the database management system 172 are illustrated as being contained within the main memory 102, these elements are not necessarily all completely contained in the same storage device at the same time. Further, although the constraint data 168, the database 170, and the database management system 172 are illustrated as being separate entities, in other embodiments some of them, or portions of some of them, may be packaged together.

The database 170 includes data, e.g., organized in rows and columns of data tables, and may also include indexes used to access the data. The database 170 is further described below with reference to FIG. 2. The constraint data 168 is further described below with reference to FIG. 3.

In an embodiment, the database management system 172 include instructions capable of executing on the processor 101 or statements capable of being interpreted by instructions executing on the processor 101 to perform the functions as further described below with reference to FIGS. 4, 5, 6, and 7. In another embodiment, the database management system 172 may be implemented in microcode. In another embodiment, the database management system 172 may be implemented in hardware via logic gates and/or other appropriate hardware techniques in lieu of or in addition to a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 may include some or all of the hardware components already described for the computer system 100. The client 132 includes an application 166, but in another embodiment the application 166 may be implemented in the computer system 100. The application 166 may be a user application, a third party application, an operating system, or any portion or combination thereof. The application 166 sends commands to the database management system 172, which causes the database management system 172 to create the constraint data 168 and to access the database 170 via the constraint data 168. Examples of commands that the application 166 may send to the database management system 172 include a constraint command as further described below with reference to FIG. 4, an insert command, as further described below with reference to FIG. 5, and a delete command, as further described below with reference to FIG. 6. But, in other embodiments, the application 166 may send update commands, query commands, join commands, save commands, restore commands, or any other appropriate type of commands to the database management system 172.

It should be understood that FIG. 1 is intended to depict the representative major components of the computer system 100, the network 130, and the client 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be stored in, encoded on, and delivered to the computer system 100 via a variety of tangible signal-bearing media, which include, but are not limited to the following computer-readable media:

(1) information permanently stored on a non-rewriteable storage medium, e.g., a read-only memory or storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmission medium, such as through a computer or a telephone network, e.g., the network 130.

Such tangible signal-bearing media, when carrying or encoded with computer-readable, processor-readable, or machine-readable instructions or statements that direct or control the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
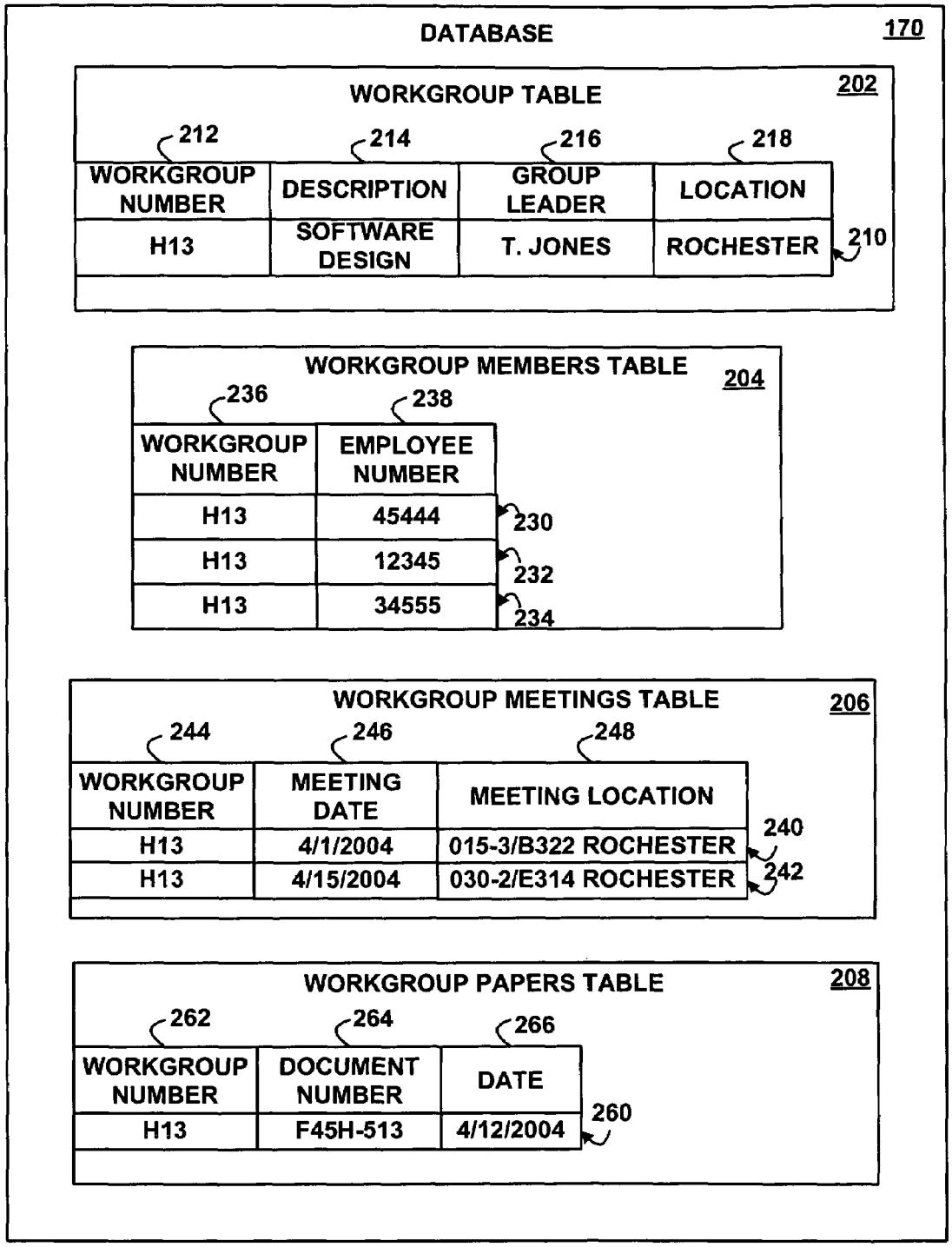
FIG. 2 depicts a block diagram of a database, according to an embodiment of the invention.

FIG. 2 depicts a block diagram of the database 170, according to an embodiment of the invention. The database 170 includes any number of tables with any appropriate format, rows, columns, and data, such as the workgroup table 202, the workgroup members table 204, the workgroup meetings table 206, and the workgroup papers table 208. The workgroup table 202 includes a row 210 and columns 212, 214, 216, and 218. The workgroup members table 204 includes rows 230, 232, and 234 and columns 236 and 238. The workgroup meetings table 206 includes rows 240 and 242 and columns 244, 246, and 248. The workgroup papers table 208 includes a row 260 and columns 262, 264, and 266.

FIG. 3 depicts a block diagram of constraint data 168, according to an embodiment of the invention. The constraint data 168 includes records 305, 310, 315, and 320, but in other embodiments any number of records with any appropriate data may be present. In an embodiment, each of the records 305, 310, 315, and 320 specifies constraint data received from a constraint command, but in other embodiments the constraint data may have any appropriate source.

Each of the records 305, 310, 315, and 320 includes a constraint identifier 330, a parent table 335, a primary key 340, a child table 345, a foreign key 350, a constraint type 355, and a delete action 360, but in other embodiments more or fewer fields may be present. The constraint identifier 330 identifies the constraint specified by the record. The parent table 335 identifies a table in the database 170 that has a primary key 340. A primary key holds a unique value for each row in the parent table 335. The child table 345 identifies a table in the database 170 that has a foreign key 350 that points to the primary key 340 in the parent table 335. Thus, a foreign key identifies rows in a different table.

The constraint type 355 indicates the type of constraint that the record directs the database management system 172 to enforce. A constraint type 355 of "foreign key" (illustrated in the example records 305, 310, and 315) directs the database management system 172 to enforce that a value for the foreign key 350 in the child table 345 must have a matching value in the primary key 340 in the parent table 335. For example, the constraint type 355 of "foreign key" in the record 305 directs the database management system 172 to enforce that a value in the foreign key 350 of workgroup number 236 in the child table 345 of the workgroup members table 204 must exist in the primary key 340 of the workgroup number 212 in the parent table 335 of the workgroup table 202.

The database management system 172 may enforce the constraint in the record 305, e.g., by requiring that an insert of the value "H13" into the workgroup number 236 of the workgroup members table 204 is only allowed to proceed if "H13" also exists in the workgroup number 212 primary key of the workgroup table 202. The database management system 172 may also enforce the constraint in the record 305 by allowing a delete of the value "H13" from the workgroup number 212 of the workgroup table 202 to proceed only if no rows in the workgroup members table 204 exist with a value of "H13" in the workgroup number 236.

In contrast to the constraint type 355 of "foreign key," the record 320 of the constraint data 168 includes a constraint type 355 of "requires," which directs the database management system 172 to enforce that a value for the primary key 340 in the parent table 335 must have a matching value in the foreign key 350 of the child table 345. Thus, the constraint type 355 of "requires" operates in an opposite direction from the constraint type 355 of "foreign key" and illustrates bi-directional referential integrity.

The database management system 172 may enforce the constraint in the record 320 by requiring that an insert of the value "H13" into the workgroup number 212 of the workgroup table 202 is only allowed to proceed if "H13" also exists in the workgroup number 236 foreign key of the workgroup members table 204. The database management system 172 may also enforce the constraint in the record 320 by allowing a delete of the value "H13" from the workgroup number 236 of the workgroup members table 204 to proceed only if no rows in the workgroup table 202 exist with a value of "H13" in the workgroup number 212.

The delete action 360 specifies the type of delete processing that the database management system 172 is to perform in response to a delete command. Examples of the delete action 360 include "restrict" and "cascade." For a restrict delete action, the database management system 172 prevents the deletion of all rows of a value of the foreign key 350 in the child table 345, as further described below with reference to FIG. 6. For a cascade delete action, if a delete command requests deletion of all rows of a value of the foreign key 350 in the child table 345, the database management system 172 deletes not only all the rows of the value of the foreign key 350 in the child table, but also deletes rows in the parent table 335 with the value and the rows in all child tables of the parent table 335 that include the value, as further described below with reference to FIG. 7.

The terms "foreign key" and "requires" for the constraint type 355 and the terms "restrict" and "cascade" for the delete action 360 are example terms only, and in other embodiments any appropriate indications may be used. Further, although the constraint data 168 is illustrated as a table, in another embodiment, any appropriate data structure may be used. In other embodiments, the information of the constraint data 168, or any portion of combination thereof, may be embedded in logic in lieu of a data structure.

Figure 4:
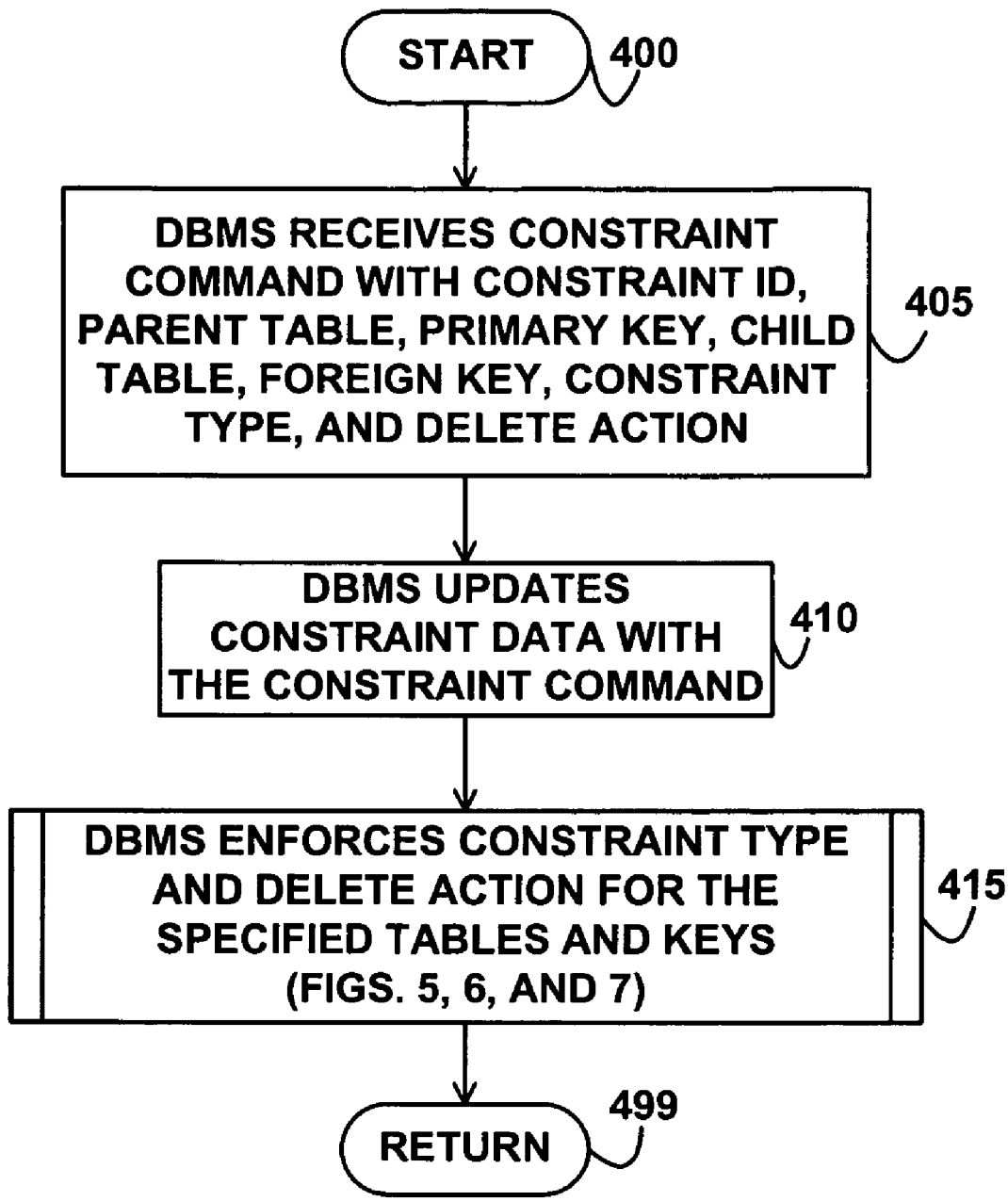
FIG. 4 depicts a flowchart of example processing for a constraint command, according to an embodiment of the invention.

FIG. 4 depicts a flowchart of example processing for a constraint command, according to an embodiment of the invention. Control begins at block 400. Control then continues to block 405 where the database management system 172 receives any number of constraint commands, each of which specifies a constraint identifier, a parent table, a primary key in the parent table, a child table, a foreign key in the child table, a constraint type, and a delete action. Control then continues to block 410 where the database management system 172 creates a record or records for the constraint commands (e.g., the record 305, 310, 315, or 320) in the constraint data 168 and stores the received constraint identifier in the constraint identifier 330, stores the received parent table in the parent table 335, stores the received primary key in the primary key 340, stores the received child table in the child table 345, stores the received foreign key in the foreign key 350, stores the received constraint type in the constraint type 355, and stores the received delete action in the delete action 360.

Control then continues to block 415 where the database management system 172 enforces the constraint type 355 and the delete action 360 for the parent table 335, the primary key 340, the child table 345, and the foreign key 350, as further described below with reference to FIGS. 5, 6, and 7. For the constraint type 355 of requires, the database management system 172 enforces that all values for the primary key 340 in the parent table 335 are present in the foreign key 350 in the child table 345.

Control then continues to block 499 where the logic of FIG. 4 returns.

Figure 5:
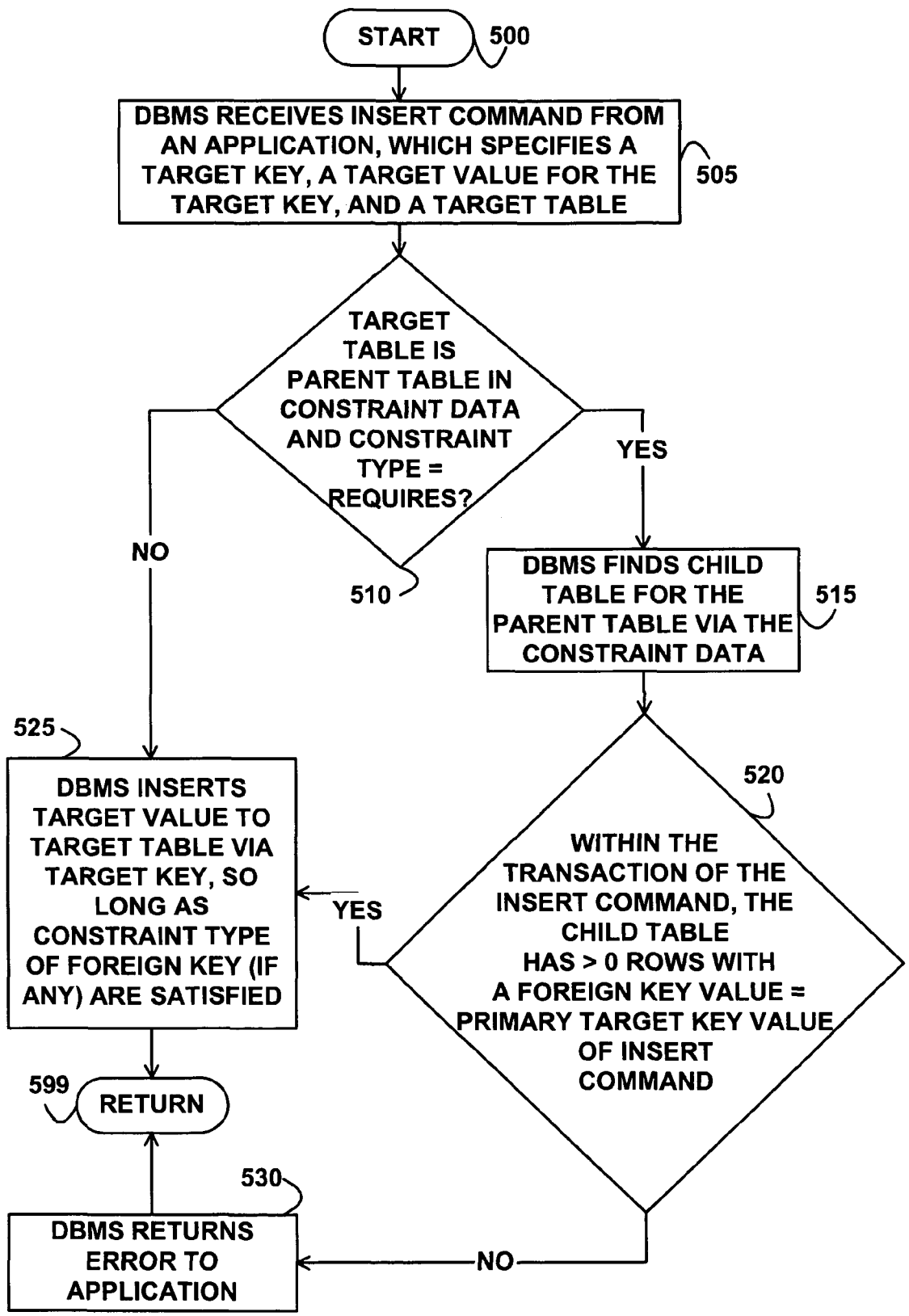
FIG. 5 depicts a flowchart of example processing for an insert command, according to an embodiment of the invention.

FIG. 5 depicts a flowchart of example processing for an insert command, according to an embodiment of the invention. Control begins at block 500. Control then continues to block 505 where the database management system 172 receives an insert command from the application 166 that specifies a target key, a target value for the target key, and a target table in the database 170, to which the insert command is directed. The insert command requests the database management system 172 to insert the target value for the target key into the target table. Using the example of FIG. 2, the insert command may specify a target table of the workgroup table 202, a target key of the workgroup number 212, and a target value of "H13." The insert command may also specify "software design" as a value of the column 214, "T. Jones" as the value for the column 216, and "Rochester" as the value for the column 218.

Control then continues to block 510 where the database management system 172 determines whether the target table specified in the insert command is a parent table 335 in a record in the constraint data 168 and whether the associated constraint type 355 in that record indicates that a child table with a matching foreign key value is required. Record 320 in the constraint data 168 is such a record for the example insert command previously described above for block 505.

If the determination at block 510 is true, then the target table specified in the insert command is a parent table 335 in a record in the constraint data 168, and the associated constraint type 355 in that record indicates that a child table 345 with a matching foreign key value is required, so control continues to block 515 where the database management system 172 finds the child table 345 specified in the record previously found at block 510. Using the example of FIG. 3, the database management system 172 finds the workgroup members table 204 specified by the child table 345 in the record 320 of the constraint data 168.

Control then continues to block 520 where the database management system 172 determines whether, within a transaction that comprises the received insert command, the child table 345 includes at least one row with a foreign key 350 value that equals the received target value of the primary key 340. Using the example of record 320 in FIG. 3 and the database of FIG. 2, for the determination at block 520 to be true, if the insert command is requesting "H13" to be added to the workgroup number 212 column (the primary key 340) of the workgroup table 202 (the parent table 335) as row 210, then the workgroup members table 204 (the child table 345) must also include at least one row with a value of "H13" in the workgroup number 236 column (the foreign key 350). Since the workgroup number 212 column is the primary key 340 in the workgroup table 202 (the parent table 335), the values of workgroup number 212 in the workgroup table 202 must be unique. Hence, for the determination of block 520 to be true, the transaction that includes the insert command that requests inserting "H13" into the workgroup number 212 of the workgroup table 202 must also include another insert command that requests inserting a row into the workgroup members table 204 (the child table 345) that includes the workgroup number 236 of "H13," which equals the target value of the primary key 340. Row 230 in the workgroup members table 204 is such a row.

If the determination at block 520 is false, then control continues to block 530 where the database management system 172 returns an error to the application 166 because the constraint (e.g., the record 320 in the constraint data 168) was not satisfied. Thus, the logic illustrated in blocks 510, 515, 520, and 530 are an example of enforcing the constraint type 355 for the received insert command. Control then continues to block 599 where the logic of FIG. 5 returns.

If the determination at block 520 is true, then control continues to block 525 where the database management system 172 inserts the target value (and any other data specified in the received insert command) to the target table in the database 170 via the specified target key, so long as any constraints with a constraint type of foreign key (e.g., records 305, 310, or 315) are satisfied if present. Control then continues to block 599 where the logic of FIG. 5 returns.

Figure 6:
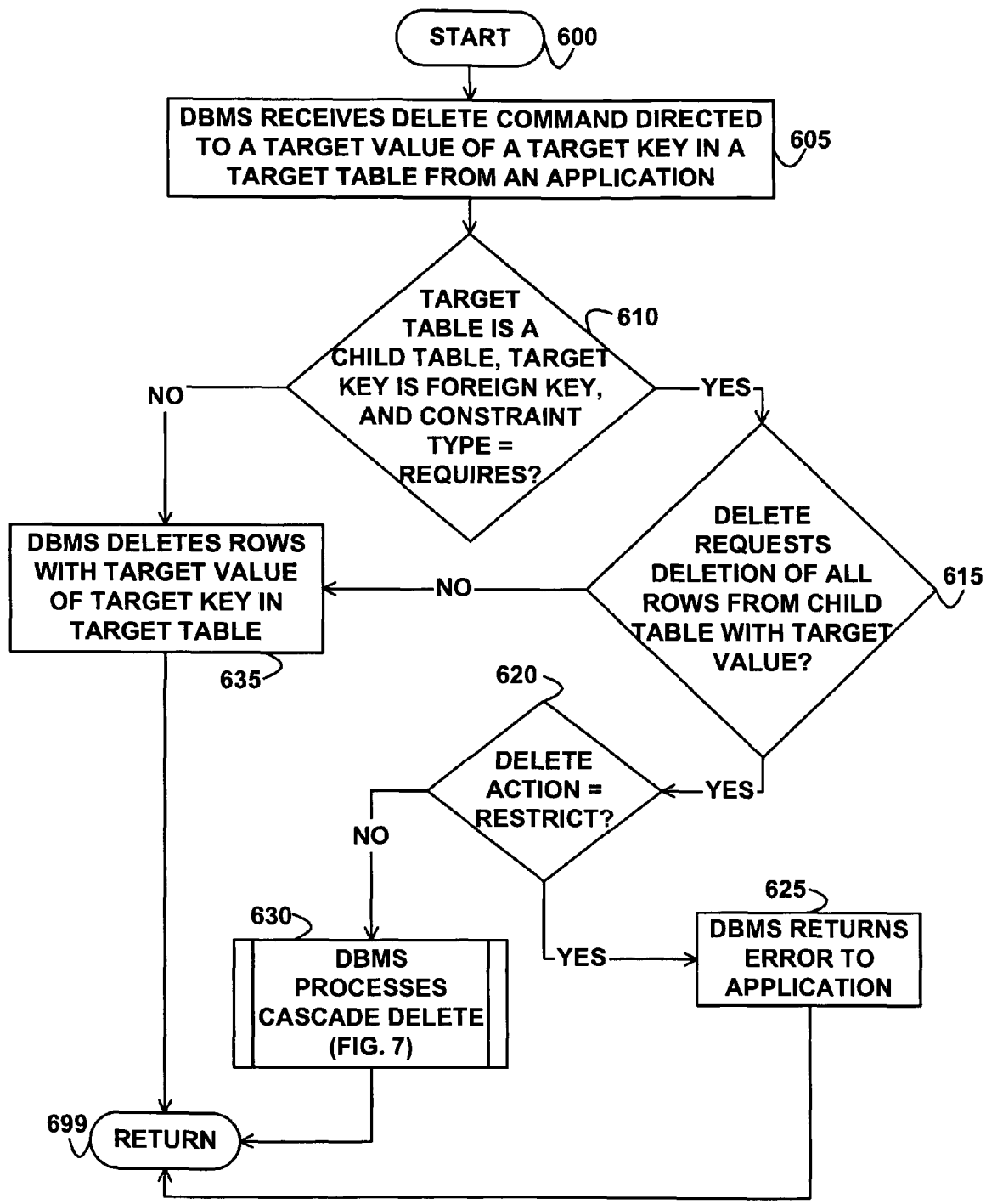
FIG. 6 depicts a flowchart of example processing for a delete command, according to an embodiment of the invention.

FIG. 6 depicts a flowchart of example processing for a delete command, according to an embodiment of the invention. Control begins at block 600. Control then continues to block 605 where the database management system 172 receives a delete command from the application 166. The delete command is directed to a target value of a target key in a target table of the database 170. Control then continues to block 610 where the database management system 172 determines whether the target table is a child table 345 in the constraint data 168, whether the target key matches the foreign key 350, and whether the constraint type 355 for the target table indicates that all values for the primary key 340 in the parent table 335 are required to be present in the foreign key 350 in the child table 345 (the constraint type 355 is "requires").

If the determination at block 610 is true, then the target table is a child table 345 in the constraint data 168, the target key is a foreign key 350, and the constraint type 355 for the target table indicates that all values for the primary key 340 in the parent table 335 are required to be present in the foreign key 350 in the child table 345, so control continues to block 615 where the database management system 172 determines whether the delete command requests deletion of all rows from the child table with the target value for the target key. That is, if the delete command is performed, all the rows in the child table 345 with the target value of the target key will be removed. If the determination at block 615 is true, then control continues to block 620 where the database management system 172 determines whether the delete action 360 indicates a restricted delete operation.

If the determination at block 620 is true, then control continues to block 625 where the database management system 172 returns an error to the application 166. Control then continues to block 699 where the logic of FIG. 6 returns.

If the determination at block 620 is false, then the delete action indicates a cascade delete operation, so control continues to block 630 where the database management system 172 processes a cascade delete, as further described below with reference to FIG. 7. Control then continues to block 699 where the logic of FIG. 6 returns.

If the determination at block 615 is false, then control continues to block 635 where the database management system 172 deletes the target rows that have the target value in the target key from the target table. Control then continues to block 699 where the logic of FIG. 6 returns.

If the determination at block 610 is false, then the target table is not a child table 345 in the constraint data 168 for which the constraint type 355 indicates that all values for the primary key 340 in the parent table 335 are required to be present in the foreign key 350 in the child table 345, so control continues to block 635, as previously described above.

Figure 7:
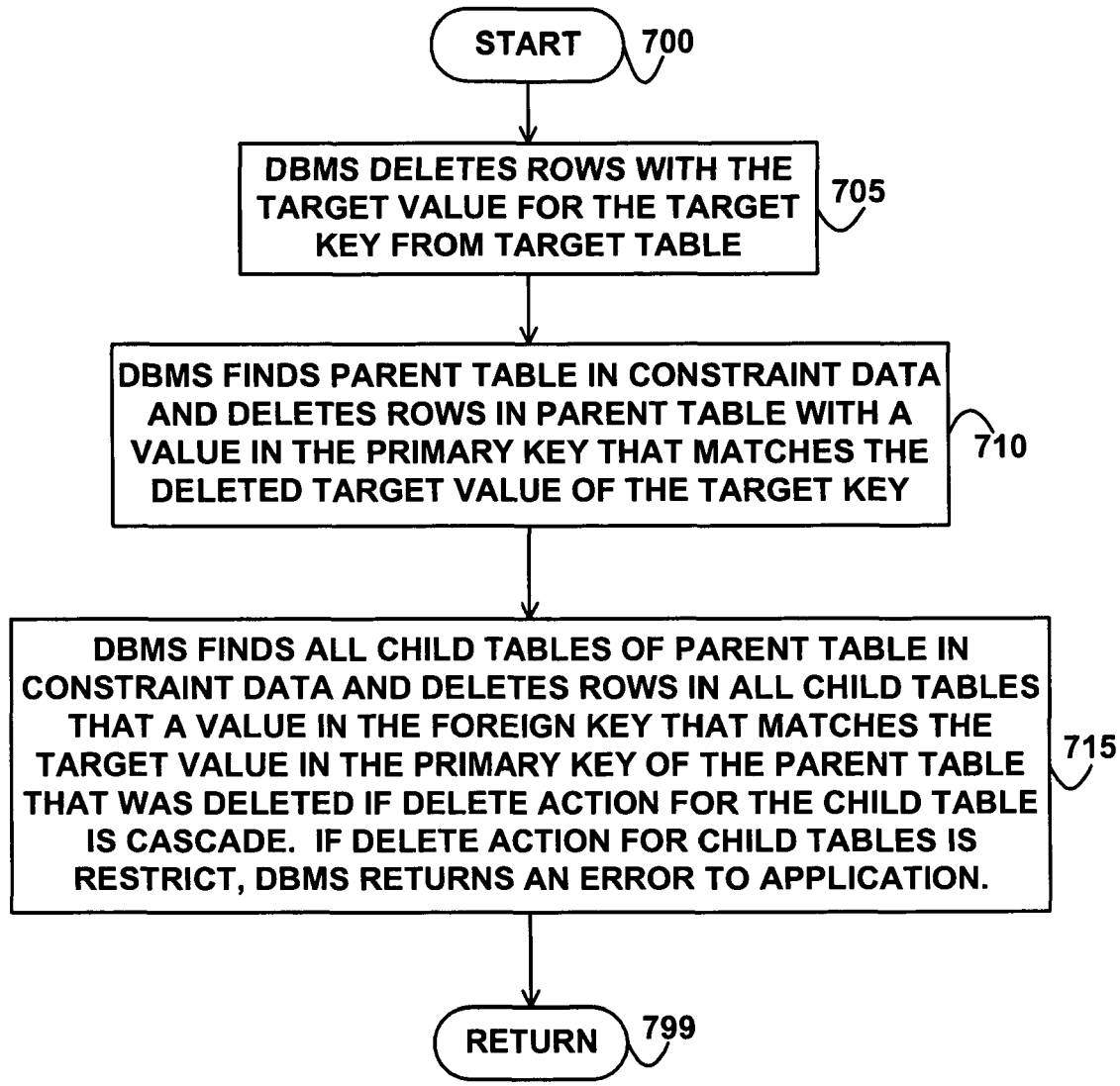
FIG. 7 depicts a flowchart of example processing for a cascading delete command, according to an embodiment of the invention.

FIG. 7 depicts a flowchart of example processing for a cascading delete request, according to an embodiment of the invention. Control begins at block 700. Control then continues to block 705 where the database management system 172 deletes rows with the target value for the target key from the target table. Control then continues to block 710 where the database management system 172 finds the parent table 335 of the target table (where the target table is the child table 345 in the same record of the constraint data 168) in the constraint data 168 and deletes all rows from the parent table 335 that have a value in the primary key 340 of the parent table 335 that matches the deleted target value of the target key.

Control then continues to block 715 where the database management system 172 finds all child tables 345 of the parent table (previously found at block 710) in the constraint data 168 and deletes all rows in all child tables 345 that have a value in their foreign key 350 that matches the target value in the primary key 340 of the parent table 355 that was deleted if the delete action 360 for the child table 345 is cascade.

Using the example of FIGS. 2 and 3, if the delete command specifies a target table of the workgroup members table 204, a target key of the workgroup number 236, and a target value of "H13," then the database management system 172, as indicated at block 705, deletes rows 230, 232, and 234 from the workgroup members table 204.

Then, as indicated at block 710, the database management system 172 finds the parent table of the workgroup members table 204 (which is the workgroup table 202) via the parent table field 335 of the record 320 in the constraint data 168. Then, the database management system 172 deletes row 210 from the workgroup table 202.

Then, as indicated at block 715, the database management system 172 finds all of the child tables of the workgroup table 202 by finding the records 305, 310, 315, and 320, which specify the workgroup table 202 as the parent table 335 with the child tables 345 in the records 305, 310, 315, and 320 being the work group members table 204, the workgroup meetings table, and the workgroup papers table 208. The workgroup members table 204 has already had all of its rows deleted that contain the target value in the target key (at block 705), so records 310 and 315 remain to be processed. Hence, the database management system 172 deletes the rows 240 and 242 from the workgroup meetings table 206 and the row 260 from the workgroup papers table 208.

If the delete action 360 for the child table 345 is restrict, then the database management system 172 returns an error to the application 166 that requested the delete command.

Control then continues to block 799 where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. Any data structures illustrated or described herein are examples only, and in other embodiments, different amounts of data, types of data, fields, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A storage medium encoded with instructions, wherein the instructions when executed comprise:
   receiving a constraint command, wherein the constraint command specifies a parent table, a primary key in the parent table, a child table, and a foreign key in the child table, wherein the constraint command requests that all values for the primary key in the parent table be present in the foreign key in the child table; and
   enforcing that all values for the primary key in the parent table are present in the foreign key in the child table, wherein the enforcing further comprises:
   receiving a first insert command, wherein the first insert command specifies a target key, a target value for the target key, and a target table,
   determining whether the target table matches the parent table and whether, within a transaction that comprises the first insert command, the child table comprises at least one row with a foreign key value that equals the target value of the primary key,
   inserting the target value into the target table if the target table matches the parent table and, within the transaction that comprises the first insert command, the child table comprises at least one row with the foreign key value that equals the target value of the primary key,
   returning an error to an application that sent the first insert command if the target table does not match the parent table, and
   returning the error to the application that sent the first insert command if, within the transaction that comprises the first insert command, the child table does not comprise the at least one row with the foreign key value that equals the target value of the primary key.

2. The storage medium of claim 1, wherein the determining further comprises:
    determining whether the transaction comprises a second insert command that requests inserting into the child table the at least one row with the foreign key value that equals the target value of the primary key.

3. The storage medium of claim 1, wherein the enforcing further comprises:
    receiving a delete command directed to the target value of the target key in the target table;
    determining whether the target table matches the child table, whether the target key matches the foreign key, and whether the delete command requests deletion of all rows from the child table with the target value; and
    returning the error if the target table matches the child table, the target key matches the foreign key, and the delete command requests deletion of all rows from the child table with the target value.

4. The storage medium of claim 3, further comprising:
    deleting the rows from the target table with the target value for the target key if the target table does not match the child table;
    deleting the rows from the target table with the target value for the target key if the target key does not match the foreign key; and
    deleting the rows from the target table with the target value for the target key if the delete command does not request deletion of all rows from the child table with the target value.

5. The storage medium of claim 1, wherein the enforcing further comprises:
    receiving a delete command directed to the target value of the target key in the target table;
    determining whether the target table matches the child table, whether the target key matches the foreign key, and whether the delete command requests deletion of all rows from the child table with the target value; and
    if the target table matches the child table, the target key matches the foreign key, and the delete command requests deletion of all rows from the child table with the target value, deleting all rows from the target table that have the target value for the target key.

6. The storage medium of claim 5, further comprising:
    if the target table matches the child table, the target key matches the foreign key, and the delete command requests deletion of all rows from the child table with the target value, deleting all rows from the parent table that have the target value for the primary key.

7. The storage medium of claim 6, further comprising:
    receiving a plurality of the constraint commands, wherein each of the plurality of the constraint commands specifies the respective parent table, the respective primary key in the respective parent table, the respective child table, and the respective foreign key in the child table; and
    if the target table matches the child table, the target key matches the foreign key, and the delete command requests deletion of all rows from the child table with the target value, finding all the child tables of the parent table that have the target value in the foreign key and deleting rows in the found child tables that have the target value in the foreign key.

8. A computer system comprising:
    a processor; and
    memory connected to the processor, wherein the memory is encoded with instructions, wherein the instructions when executed by the processor comprise:
        receiving a constraint command, wherein the constraint command specifies a parent table, a primary key in the parent table, a child table, and a foreign key in the child table, wherein the constraint command requests that all values for the primary key in the parent table be present in the foreign key in the child table, and
        enforcing that all values for the primary key in the parent table are present in the foreign key in the child table, wherein the enforcing further comprises:
            receiving a first insert command, wherein the first insert command specifies a target key, a target value for the target key, and a target table,
            determining whether the target table matches the parent table and whether, within a transaction that comprises the first insert command, the child table comprises at least one row with a foreign key value that equals the target value of the primary key,
            inserting the target value into the target table if the target table matches the parent table and, within the transaction that comprises the first insert command, the child table comprises at least one row with the foreign key value that equals the target value of the primary key,
            returning an error to an application that sent the first insert command if the target table does not match the parent table, and
            returning the error to the application that sent the first insert command if, within the transaction that comprises the first insert command, the child table does not comprise the at least one row with the foreign key value that equals the target value of the primary key.

9. The computer system of claim 8, wherein the determining further comprises:
    determining whether the transaction comprises a second insert command that requests inserting into the child table the at least one row with the foreign key value that equals the target value of the primary key.

10. The computer system of claim 8, wherein the enforcing further comprises:
    receiving a delete command directed to the target value of the target key in the target table;
    determining whether the target table matches the child table, whether the target key matches the foreign key, and whether the delete command requests deletion of all rows from the child table with the target value; and
    returning the error if the target table matches the child table, the target key matches the foreign key, and the delete command requests deletion of all rows from the child table with the target value.

11. The computer system of claim 10, wherein the instructions further comprise:
    deleting the rows from the target table with the target value for the target key if the target table does not match the child table;
    deleting the rows from the target table with the target value for the target key if the target key does not match the foreign key; and
    deleting the rows from the target table with the target value for the target key if the delete command does not request deletion of all rows from the child table with the target value.

12. The computer system of claim 11, wherein the enforcing further comprises:

receiving a delete command directed to the target value of the target key in the target table;

determining whether the target table matches the child table, whether the target key matches the foreign key, and whether the delete command requests deletion of all rows from the child table with the target value; and if the target table matches the child table, the target key matches the foreign key, and the delete command requests deletion of all rows from the child table with the target value, deleting all rows from the target table that have the target value for the target key.

13. The computer system of claim 12, wherein the instructions further comprise:

if the target table matches the child table, the target key matches the foreign key, and the delete command requests deletion of all rows from the child table with the target value, deleting all rows from the parent table that have the target value for the primary key.

14. The computer system of claim 13, wherein the instructions further comprise:

receiving a plurality of the constraint commands, wherein each of the plurality of the constraint commands specifies the respective parent table, the respective primary key in the respective parent table, the respective child table, and the respective foreign key in the child table; and if the target table matches the child table, the target key matches the foreign key, and the delete command requests deletion of all rows from the child table with the target value, finding all the child tables of the parent table that have the target value in the foreign key and deleting rows in the found child tables that have the target value in the foreign key.

* * * * *